United States Patent
> Smith

[15] 3,703,910
[45] Nov. 28, 1972

[54] MEANS TO PREVENT EXTERNAL PLUG VALVE LEAKAGE

[72] Inventor: Russell G. Smith, Cincinnati, Ohio

[73] Assignee: Xomox Corporation, Cincinnati, Ohio

[22] Filed: Feb. 24, 1971

[21] Appl. No.: 118,450

[52] U.S. Cl. .....................137/375, 277/33, 251/309
[51] Int. Cl. ............................F16k 27/12, F16k 5/02
[58] Field of Search ..277/33, 58; 137/375, 377, 381; 251/214, 309, 314, 317, 335

[56] References Cited

UNITED STATES PATENTS

| | | | |
|---|---|---|---|
| 2,487,436 | 11/1949 | Goehring | 251/309 |
| 2,926,884 | 3/1960 | Clinkenbeard | 251/309 X |
| 3,192,942 | 7/1965 | Manor et al. | 251/214 X |
| 3,206,163 | 9/1965 | Freed | 251/309 |
| 3,235,272 | 2/1966 | Smith | 251/214 X |
| 3,371,676 | 3/1968 | Mullaney | 251/214 X |
| 3,396,940 | 8/1968 | Jones | 251/335 R |
| 3,406,707 | 10/1968 | Schenck | 251/214 X |

Primary Examiner—Henry T. Klinksiek
Attorney—J. Warren Kinney, Jr.

[57] ABSTRACT

The tapered plug of the valve is provided with two adjustments: (a) three plug alignment set screws which properly position the plug to obtain a tight line seal and proper port alignment with the body ports, and properly align external sealing means with plug external seal surfaces, and (2) a plug end adjustment to micrometrically compress a plug shoulder seal against external leakage along the actuating stem.

16 Claims, 1 Drawing Figure

PATENTED NOV 28 1972 3,703,910
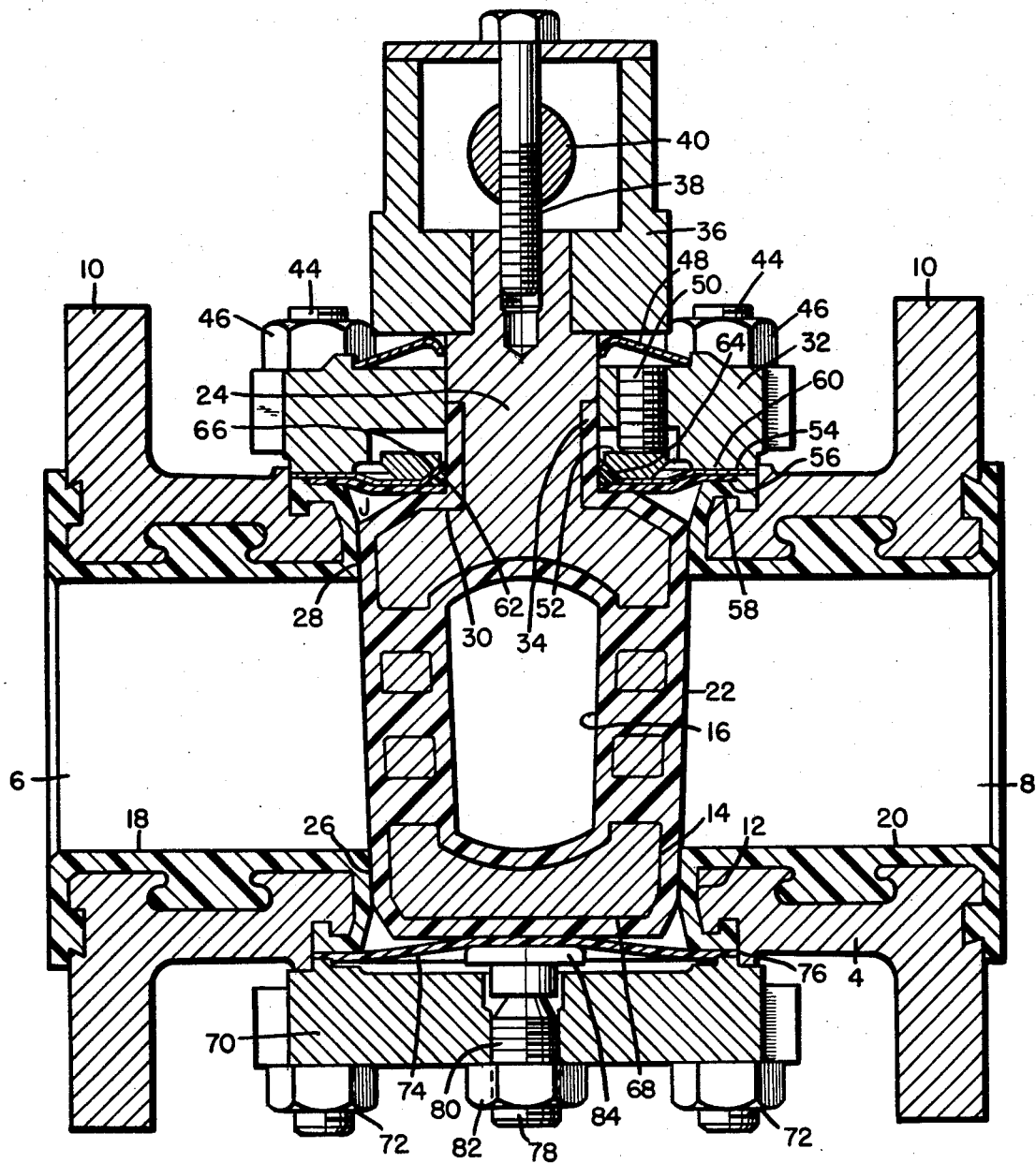
INVENTOR
RUSSELL G. SMITH
BY J. Warren Kinney Jr
ATTORNEY 3,703,910

MEANS TO PREVENT EXTERNAL PLUG VALVE LEAKAGE

BACKGROUND OF THE INVENTION

Considerable activity has been directed to the development of valves which are lined with various types of non-metallic materials adapted to withstand the damaging effects of corrosive fluids, high pressures, and various other elements encountered in the control of piped liquids and gases. The lining material employed is usually a gas and liquid impervious material such as Teflon or equivalent substance which provides an excellent seal under proper conditions of use, while at the same time offering minimal resistance to valve plug rotation, particularly in the case of larger valves.

Most valves of the kind referred to pose a persistent problem of external leakage at some stage of service in a pipe system. Moreover, it is not unusual for a new factory-tested valve to present an external leakage problem which defies solution, when placed in actual service. Such occurrences sometimes involve very costly remedial procedures when the fault becomes evident after completion of a complex pipe system installation.

A portion of the relevant prior art is exemplified in the patents to: J. B. Freed, U.S. Pat. No. 2,913,219, dated Nov. 17, 1959; Freed U.S. Pat. No. 2,735,645, dated Feb. 21, 1956; Freed U.S. Pat. No. 3,199,835, dated Aug. 10, 1965; Dewrance, et al. U.S. Pat. No. 195,707, dated Oct. 2, 1877; Schenck, et al. U.S. Pat. No. 2,987,295, dated June 6, 1961; and Floyd U.S. Pat. No. 3,090,594, dated Dec. 19, 1960.

Most, if not all, of the aforesaid patents disclose lined plug valves having a tapered plug in a lined valve body bore and which utilize an axially shiftable pressure screw for elevating the plug towards its smaller end for increasing the interference fit between the plug and liner, in an effort to overcome internal leakage, downstream past the plug; however, such tightening of the pressure screw and the resultant axial movement of the plug has no beneficial or modifying effect upon the top external seal which surrounds the actuating stem of the plug.

The balance of the relevant prior art is best exemplified in my U. S. Pat. No. 3,540,740 dated Nov. 17, 1970, which discloses means for effecting a circumferential seal between the plug and valve body; and an improved seal between a portion of the top of the plug and a diaphragm engaged thereby, and an improved seal between the shank of the plug, a delta ring, and a pressure seal ring which is adjustably mounted for movement relative to the cover plate. The top or external seals of my aforesaid patent has been highly effective under most conditions, however, it has been found that in some instances the line pressure against the plug, when in closed condition, tends to push the plug against the downstream side of the valve bore for enhancing the circumferential seal between the plug and valve body. Such movement of the plug, even though minute, sometimes results in a slight leak between the plug and the primary circumferential seal on the upstream side of the valve. Such minute circumferential leakage past the body and the plug causes a pressure build-up on top of the plug which forces the plug down with the result that the top or external seal between the plug and the diaphragm, which it originally abutted, is impaired to such an extent that the top seal is rendered more or less ineffective and leakage occurs along the stem of the plug.

SUMMARY OF THE INVENTION

The present invention involves the use of a micrometric or rather finely threaded adjustment screw advanceable axially of the valve plug to compress the top and stem seal thereof. Equalized seating of the plug, and alignment of its port with the ports of the valve body, are functions delegated to a three-point equalizing adjustment means surrounding the stem, as more fully disclosed in my U.S. Pat. No. 3,540,740. Motions of the three-point equalizing adjustment means and of the micrometric plug adjustment screw are interrelated, in that an advancement of said screw to compress the top or stem seal produces in effect a practically imperceptible loosening of the plug relative to its tapered seat in the body bore; however, such minute loosening of the plug is found not productive of leakage if the plug is otherwise properly adjusted, this being due to the "memory" characteristic of the plastic liner incorporated in the valve construction.

The invention also is very effective in preventing external leakage when valve is subjected to temperature changes. As valve is heated the relative thick section of Teflon surrounding the plug and lining the body expands approximately 10 times the metal encapsulating body. This causes Teflong to flow and results in a looser fit between body and plug. Plug can still seal downstream due to differential pressure and since external seal means has considerable less thickness of Teflon differential expansion does not effect the external seal.

An object of the invention is to provide in a lined plug valve, highly effective yet simple and inexpensive means for preventing both internal and external leakage of fluid-control valves, whether the valve is fully lined or only partly lined. The invention, moreover, is applicable to plug valves having right cylindrical as well as tapered plugs.

DESCRIPTION OF THE PREFERRED EMBODIMENT

In the drawing, the reference numeral 4 indicates a valve body, usually of cast metal, having a fluid inlet port 6 and a fluid outlet port 8, each of which ports may be defined externally by suitable flanges 10, 10 or other means for connecting the valve in a pipe system.

Between the ports 6 and 8, the body is transversely cored or bored to provide a plug receptive cavity or bore 12 in which is supported an elongate rotary valve plug 14 having a through port 16, which upon rotation of the plug, may be placed in registry or out of registry with said ports 6 and 8 as is usual.

In the embodiment shown by way of example, lining elements 18 and 20 line the body ports 6 and 8, respectively, as well as the plug receptive cavity 12. A lining element 22 may envelop the valving portion of the plug, including the port 16 and a portion of the actuating stem 24. If desired, however, the plug may be formed without a lining element, in which case the material thereof shown cross-hatched for plastic on FIG. 1, would in fact be metal.

The lining material shown at 18, 20 and 22, may be a suitable plastic or fluorocarbon material having qualities such as will facilitate firm adherence to the metal surfaces in molding, along with imperviousness and an inherently low coefficient of friction. Material such as Teflon meets the requirements specified, and is further characterized by its having a constitutional "memory," or ability to return substantially to an initial state following a release from compression or other stress previously applied thereto. Due to differences in molding techniques peculiar to coating of the plug and the valve body, ease of liner application may favor the use of different forms of plastic in coating these parts, if desired.

With further reference to the drawing, the plug is seen to have a stem portion 24, a circumferential end portion 26, and a circumferential intermediate portion 28, said portions 26 and 28 flanking the plug port 16. The outer areas of portions 26 and 28, and the ported area between them, seat against the lining material of the body cavity that embraces the plug.

The actuating stem 24 extends axially from plug portion 28, and meets said portion 28 at an annular shoulder 30 which may be coated with lining material. Shoulder 30, by preference though not of necessity, lies in a plane which is substantially at right angles to the plug axis. It must be understood that shoulder 30, if desired, may slope to some extent in the direction of circumferential portion 28 without impairing the function of the shoulder, later to be explained.

Stem 24 where engaged by the external seal elements 52, 54, 56, 62, may be coated with the plastic material of the plug as indicated at 34. Outwardly beyond said coating, that portion of the stem which is exposed may be fitted with a hub 36 secured to the stem by means of a screw 38. A transversely directed handle 40 supported by hub 36 facilitates rotation of the valve plug between open and closed positions.

Cover 32 surrounds the stem and may be secured to the valve body by a plurality of bolts 44 carrying nuts 46. A centrally apertured coniform washer 48 surrounding the stem and underlying hub 36, may serve as a dust guard for the concealed portion of the actuating stem. The bonnet carries three adjusting screws 50, all of which are parallel to the plug axis and spaced equally therefrom, as well as equally from one another. The inner ends of the screws 50 bear upon the upper face of a rigid metal pressure ring 52 which loosely surrounds the actuating stem.

The reference numerals 54 and 56 indicate two circular discs or diaphragms each centrally apertured to receive the stem 24. The outer or circumferential margins of diaphragms 54 and 56 are adapted to be clamped securely between bonnet 32 and an annular coated seat 58 provided on valve body 4. Seat 58 surrounds the actuating stem and pressure ring 52, and may be countersunk in the valve body material as shown. An annular lower clamping face 60 of the bonnet overlies seat 58 and the outer margins of diaphragms 54 and 56.

When nuts 46 are tightened, face 60 of the bonnet bears firmly against the diaphragms and coated annular seat 58 to form a leakproof seal between the clamped parts.

Diaphragm 56 may be a substantially flat disc of Teflon or equivalent fluorocarbon material having a low coefficient of friction, and a marginal area of its central aperture lies upon the exposed surface of coated plug shoulder 30. The edge of the central aperture thereof preferably abuts or lay very close to the upright cylindrical portion of stem 24.

Upon the marginal area of the central aperture of diaphragm 56 is disposed a delta ring or similar deformable gasket 62, which surrounds snugly the coated portion of stem 24 closely adjacent to shoulder 30. The delta ring or gasket 62 may be formed of any suitable flexible material which is capable of effecting a fluid seal along the coated stem, an example of which is Teflon. The obliquely inclined outer face of ring 62 is exposed to a portion of the overlying diaphragm 54, and subtends the angle between coated shoulder 30 and coated stem 24.

Uniformly satisfactory results have been obtained in those instances when diaphragm 54 which overlies diaphragm 56, is formed of a fluorocarbon material such as Teflon wherein its central aperture marginal area is inclined upwardly and inwardly as a continuous flange, to form an annular lip 64 inclined at an angle approximating the slope of the outer face of ring 62. The innermost edge of flange or lip 64 need not be in direct contact with stem 24.

Pressure ring 52 preferably has an obliquely inclined face or chamfer 66 the angularity of which approximates the angular inclination of lip 64, so that force applied vertically downwardly upon ring 52 by screws 50, will serve to compact and expand the delta ring 62 by way of lip 64, into effective adjusted sealing contact with the coated shoulder 30 and coated stem 24.

It may here be noted that the tripodal arrangement of adjusting screws 50 makes possible a tilting of pressure ring 52, incident to the screw adjustments, whereby the valve plug may be cocked or biased in any desired lateral direction within the plug receptive cavity 12. The plug thereby may be adjustably biased bodily toward body port 6 or toward body port 8, as may be found effective to preclude internal leakage of fluid past the plug under various service conditions which may take into account high or low pressures or temperatures of fluid, or slight structural variations in the valve manufacture or final assembly.

The plug receptive body cavity 12 initially is open at its lower end to expose the coated lower face or terminal end portion 68 of the plug; however, in practice the lower end of the cavity is closed by a plate or cap 70 which may be detachably secured to the valve body as by means of threaded fasteners 72.

Cap 70 clamps and secures the outer marginal portion of a flexible diaphragm 74 in leakproof manner against the valve body, or against the liner of the valve body at 76. The seal at 76 is annular and continuous, and will accordingly preclude all possibility of external leakage of fluid past cap 70.

Cap 70 carries externally accessible means for bodily shifting the valve plug axially against the diaphragms 54, 56 and rings 62, 52, for perfecting the actuating stem seal. Such means may include a micrometric adjusting screw 78 threadedly engaging internal fine threads in a central bore 80 of the cap, and securable in adjusted position by a jam nut 82. The inner end of screw preferably supports a stool 84 which does not rotate with the screw, this being to avoid chafing or puncturing the flexible diaphragm 74 when screw 78 is rotated. The diaphragm 74 preferably is formed of a flexible impermeable plastic or fluorocarbon material, of which Teflon is an example. Rubber or rubber-like diaphragms may be used in this valve if desired, this depending upon the service conditions to which the valve may be exposed.

OPERATION OF THE DEVICE

The valve assembled as shown may be connected in a pipe system for control of a liquid or gas under pressure. The fluid controlled is often highly corrosive, and may be conveyed through pipes and valves which are quite large. The largest valves may be hydraulically or mechanically opened and closed, rather than manually actuated, particularly under high fluid pressure conditions.

Initially, the tripodal screws 50 are adjusted so as to properly center or locate the plug in the bore or cavity 12, with plug port 16 disposed in substantial registry with body ports 6 and 8. During which time the adjusting screw 78 is in a retracted position for providing a space between the lower or terminal face of the plug and the adjacent surface of diaphragm 74. Adjustment of screws 50 also provides an effective top or external seal between the adjacent surfaces of upper shoulder 30 of the plug and diaphragm 56; between diaphragm 56 and 54; and between the delta ring 62, shank 34, diaphragm 56 and diaphragm 54. Thereafter the adjusting screw is advanced for applying a positive pressure against the lower surface of the plug via stool 84 and bottom diaphragm 74, as clearly illustrated in the drawing, for augmenting and enhancing the top or external seals between the plug and valve body.

When connected in a pipe system, the valve plug in closed position may be subjected to upstream fluid pressure sufficient to cock or force the plug out of complete circumferential upstream contact with bore 12, resulting in circumferential internal leakage of fluid past the plug and thence upwardly into area J. Pressure in this area tends to displace the plug toward its lower end with concurrent impairment of the top seal between the plug and diaphragm 56 causing external leakage along the actuating stem 24. Such external leakage may be promptly and effectively overcome and terminated by advancing the micrometric adjustment screw 78 in the direction of pressure ring 52, thereby to microscopically elevate the plug to produce the desired compression between shoulder 30 of the plug, the diaphragm 54 and 56 and the delta ring 62, for thereby restoring the top or external seal between the plug, stem and sealing elements associated therewith.

The extent to which the adjusting screw 78 need be advanced in order to terminate external leakage about stem 24 is infinitesimal, hence the use of micrometric threads on the screw. The aforesaid adjustment at screw 78 has no detrimental effect on the line seal by reason of upstream pressure supplementing line seal and the memory characteristic of the lining material which covers the plug and lines the bore or cavity 12 in which the plug rotates.

The present invention is also readily applicable to right cylindrical plug valves having a top or external seal as that term is used in this disclosure.

The present invention is also applicable to plug valves of the type in which uncoated metal plugs are received within a sleeve member of fluorocarbon material, or the like, secured to and carried by the bore of a valve body, as in U.S. Pat. No. 3,540,740, so long as sealing means are provided which engage the top, or portions of the upper surface of the plug as contrasted with sealing means which engage only the stem portion of the plug of a valve.

It should be understood that the drawing illustrates but one type of top or external seal, and that the subject invention is ideally adapted for use with valves having other types of top seals, such as, by way of example, are illustrated in my U.S. Pat. No. 3,540,740.

What is claimed is:

1. A plug valve comprising, a valve body having inlet and outlet ports therein, a valve chamber in said valve body between said inlet and outlet ports and intersecting said ports and open at its opposite ends through said valve body, a tapered valve plug rotatably mounted in said chamber and having a transverse bore therethrough alignable with said inlet and outlet ports, said tapered valve plug having an end face at one end thereof and extending at said one end into one of said chamber open ends, the valve plug being larger in diameter at the other end thereof and extending at said other end into the other of said chamber open ends, a reduced diameter valve stem on said other end of said valve plug and extending axially therefrom through said other open end of said chamber to exteriorly of the valve body and defining with said valve plug an annular shoulder, external stem sealing means at said other open end of said chamber in sealing relationship with said valve stem, a valve bonnet secured to said valve body over said other open end of said chamber and in surrounding relationship to said stem, an annular pressure ring in overlying relationship to the stem sealing means, a plurality of equally spaced adjusting screws extended through said bonnet and into engagement with said pressure ring for pressing the stem sealing means into sealing engagement with said stem and to initially adjust the position of said valve plug in said chamber, sealing means at said one end of said valve plug and said one open end of said chamber to seal said one end of said valve plug relative to said valve body, a cap secured to said valve body over said one open end, and an adjusting screw means threadedly extended through said cap and into cooperative association with said end face to urge said valve plug toward said stem sealing means to effect a leak tight seal at the other end of the valve plug.

2. A valve as defined by claim 1, wherein said adjusting screw means includes a rotatable micrometric screw having an outer end exposed for manipulation exteriorly of the valve body.

3. A valve as called for in claim 1, in which a flexible sealing diaphragm is interposed between the end face of the valve plug and the said adjusting screw means for applying an axial force to said end face of the plug.

4. A valve as called for in claim 3, wherein an enlarged bearing member is interposed between said diaphragm and the said adjusting screw means for applying an axial force to the end face of the plug.

5. The valve as defined by claim 1, wherein the rotatable screw has micrometric threads thereon for making fine adjustments of said plug.

6. A plug type valve comprising in combination:

a rotary plug which comprises, a circumferential end portion, a circumferential intermediate portion, an end face, and an actuating stem having a free end extending from said intermediate portion; a through port in the plug between the stem and said end face; an annular shoulder on said circumferential intermediate portion of the plug and surrounding said stem, said shoulder having an annular surface exposed in the general direction of the free end of the actuating stem; a valve body having an inlet port and an outlet port, and a lined intermediate transverse bore rotatably supporting said circumferential portions of the plug; a bonnet surrounding the actuating stem and having an annular clamping face overlying an annular margin of said bore; diaphragm means having an aperture in which the stem is rotatable, said aperture having an inner marginal portion overlying and contacting the exposed surface of said plug shoulder; said diaphragm means having an outer peripheral margin; means securing the bonnet upon the valve body with the outer peripheral margin of said diaphragm means clamped and sealed between said annular margin of the body bore and said clamping face of the bonnet; a pressure ring surrounding the stem, said ring having one face in contact with the diaphragm means, and an opposite face exposed to the bonnet; a plurality of equally spaced adjustable means extended through said bonnet and into engagement with said pressure ring for advancing the pressure ring against the diaphragm means and to force said diaphragm means against the aforesaid annular surface of the plug shoulder; and adjustable means cooperatively associated with the end of the plug opposite said stem for bodily shifting the plug axially in the direction of the bonnet, for modifying the force imposed by said plug shoulder surface and said pressure ring upon the inner marginal portion of the diaphragm means.

7. The valve as defined by claim 6, wherein said adjustable means last mentioned includes a rotatable screw having an outer end exposed for manipulation exteriorly of the valve body, and means at the inner end of said screw for applying force to said end face of the plug.

8. The valve as defined by claim 7, wherein the combination includes a cap secured to the valve body in covering relation to said end face of the plug; and a flexible sealing diaphragm having a central portion disposed intermediate said means at the inner end of said screw and said plug end face; said last mentioned flexible sealing diaphragm having an outer marginal portion secured and sealed between the valve body and said cap.

9. The valve as defined by claim 7, wherein the combination includes a cap secured to the valve body in covering relation to said end face of the plug; and a flexible sealing diaphragm having a central portion disposed intermediate said means at the inner end of said screw and said plug end face; said last mentioned flexible sealing diaphragm having an outer marginal portion secured and sealed between the valve body and said cap.

10. The valve as defined by claim 6, wherein the combination includes a deformable delta ring having sealing contact against the stem, and positioned for wedging between the pressure ring and said diaphragm means first mentioned.

11. The valve as defined by claim 10, wherein the stem where contacted by said delta ring, and the plug in the regions of said shoulder, said end face and said circumferential portions, carry a coating of fluorocarbon material of the class of Teflon.

12. The valve as defined by claim 6, wherein the stem, and the plug in the regions of said shoulder, said end face, and said circumferential portions, carry a coating of fluorocarbon material.

13. The valve as defined by claim 6, wherein the aforesaid plurality of adjustable means for advancing the pressure ring, comprises a set of three adjustable screws carried by the bonnet, said screws being substantially equidistant from the plug stem, and substantially equidistant from one another.

14. The valve as defined by claim 6, wherein the aforesaid plurality of adjustable means for advancing the pressure ring, includes means to tilt said pressure ring relative to the mean plane of the bonnet; and the stem and the plug in the regions of said shoulder, said end face, and said circumferential portions, carry a coating of fluorocarbon material.

15. The valve as defined by claim 14, wherein the combination includes a deformable delta ring having sealing contact against the stem, and positioned for wedging between the pressure ring and said diaphragm means first mentioned.

16. The valve as defined by claim 6, wherein is included in the combination a dust guard surrounding the actuating stem exteriorly of the bonnet.

* * * * *